United States Patent Office 3,517,070
Patented June 23, 1970

3,517,070
HYDROQUINONE COMPOUNDS
Urs Gloor, Riehen, Rudolf Ruegg, Bottmingen, and Ulrich Schwieter, Reinach, Switzerland, assignors to Hoffmann-La Roche Inc., Nutley, N.J., a corporation of New Jersey
No Drawing. Original application Aug. 3, 1959, Ser. No. 831,027, now Patent No. 3,118,914, dated Jan. 21, 1964. Divided and this application Feb. 14, 1963, Ser. No. 258,609
Claims priority, application Switzerland, Aug. 7, 1958, 62,670/58; Aug. 28, 1958, 63,369/58
Int. Cl. C07c 43/20
U.S. Cl. 260—613          2 Claims This invention relates to novel chemical products and to novel methods of obtaining the same. More particularly, the invention relates to novel 2,3-dimethoxy-5-methyl-6-substituted 1,4-benzohydroquinones and 4-monoesters thereof, to correspondingly substituted 1,4-benzoquinones and to correspondingly substituted chromanols; and to methods of making all of the foregoing.

This is a division of our copending patent application Ser. No. 831,027, filed Aug. 3, 1959 and now Pat. No. 3,118,914.

In one of its important novel synthesis embodiments, the invention provides a process which comprises reacting 2,3-dimethoxy-5-methyl-1,4-benzohydroquinone or a 4-monoacyl derivative thereof in the presence of an acidic condensing agent with a compound represented by the formula (I)

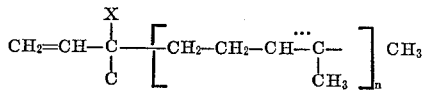

wherein the double bond shown by the dotted line can optionally be fully hydrogenated, $n$ represents a number from 0 to 9, inclusive, and X represent a member selected from the group consisting of halogen, hydroxy, and acyloxy, or with an allyl-rearrangement product thereof. An optional further step in the syntheses of the invention comprises saponifying the condensation product obtained. Still a further optional step comprises oxidizing the condensation product, or, respectively, the saponification product to the correspondingly substituted 1,4-benzoquinone. Still a further optional step comprises cyclizing the condensation product, before or after saponification, to the correspondingly substituted chromane derivative.

The condensation step referred to above requires, on the one hand, a substituted benzohydroquinone compound and, on the other, a condensation component represented by Formula I above or an allyl rearrangement product thereof.

The substituted benzohydroquinones referred to include 2,3-dimethoxy-5-methyl-1,4-benzohydroquinone and its 4-monoacyl derivatives. Suitable acyl derivatives include, for example, the 4-mono-lower alkanoates (e.g. the 4-monoacetate) and the 4-monobenzoate.

The structure of the compounds of Formula I required for the condensation derives from isoprene. Either the reactive group (hydroxy, acyloxy or halogen) is a terminal group, in which case there is a double bond in $\alpha,\beta$ position to the reactive group; or the reactive group is attached to the number 3 carbon atom. In the latter case, the condensation component possesses a tertiary reactive group at the number 3 position, and there is a double bond between the number 1 and number 2 carbon atoms, in $\alpha,\beta$-relation to the reactive group. The condensation component can be a 10-carbon atom reagent, or its chain can be lengthened by multiples of five carbon atoms, up to a total of fifty carbon atoms. The lengthening of the chain can be effected by incorporation of either saturated or unsaturated 5-carbon atom building blocks. Examples of alcohols suitable for use in the invention include phytol, isophytol, linalool, geranyllinalool and farnesylnerolidol. Instead of the alcohols, their esterification products with acids (e.g. acetates, chlorides and bromides) can be employed as condensation components. If one starts from the tertiary halides, generally the condensation component is primarily the allyl-rearrangement product, having the halogen atom attached to the number 1 carbon atom, inasmuch as the tertiary halides having a terminal double bond are unstable and rearrange to the 1-halides. Examples of such rearranged halides are geranyl bromide and phytyl bromide.

The reaction of the 2,3-dimethoxy-5-methyl-1,4-benzohydroquinone or, respectively, a 4-monoacyl derivative thereof, with the compound of Formula I or, respectively, an allyl rearrangement product thereof, is effected in the presence of an acidic condensing agent and can be accomplished under either mild or energetic reaction conditions.

Upon employment of mild reaction conditions, the hydrogen atom in the nuclear 6-position of the 1,4-benzohydroquinone derivative employed is substituted by the aliphatic rest of the compound of Formula I employed for the condensation. This reaction is preferably effected in the presence of an inert solvent, e.g. diethyl ether, diisopropyl ether or dioxan, at room temperature, or at the reflux temperature of diethyl ether. In order to avoid side reactions, heating of the reaction mixture above about 40° C. should in general be avoided. As the acidic condensing agent, zinc chloride with an addition of glacial acetic acid is especially suitable. In a preferred mode of execution, an alcohol of Formula I is employed, and zinc chloride is employed as the condensing agent in absolute ether with addition of a little glacial acetic acid, at a temperature below 40° C.

In the case where the starting material is an acyl derivative of a benzohydroquinone, the hydroxy group in the 4-position of the condensation product can be liberated by saponification. Saponification is suitably effected by means of alkaline solutions, e.g. by means of methanolic potassium hydroxide solution, advantageously in an inert gas atmosphere, e.g. under nitrogen. In the case where the condensation products are to be cyclized rather than oxidized, the saponification can also be effected after the cyclization step.

The condensation products obtained are yellow to orange, 6-substituted-2,3-dimethoxy-5-methyl-1,4-benzohydroquinones, which can suitably be purified by chromatography. They can either be oxidized to the corresponding quinones or cyclized to the correspondingly substituted chromane derivatives.

In order to effect oxidation of the substituted 1,4-benzohydroquinones obtained, methods known per se are employed, e.g. by shaking the substituted 1,4-benzohydroquinone in ethereal solution with silver oxide at room temperature. The crude products can be purified by methods known per se, suitably by chromatography. They are yellow compounds and exhibit typical maxima in the ultraviolet absorption spectrum.

If, on the other hand, the 6-substituted-2,3-dimethoxy-5-methyl-1,4-benzohydroquinones are to be cyclized to the correspondingly substituted chromane compounds, they are treated with an acidic cyclizing agent under energetic reaction conditions. For this purpose it is appropriate to effect the reaction in an inert solvent, e.g. in petroleum ether, at a temperature above about 40° C., e.g. at the reflux temperature of the reaction mixture. In the case where the substituent in the 6-position of the hydroquinone is unsaturated, the reaction conditions must be so selected that the unsaturated substituent is not attacked during the reaction. The use of boron trifluoride etherate in petroleum ether solution has been found to be especially suitable. In the event that the substituent in the 6-position of the hydroquinone is (aside from the β,γ-double bond) saturated, other acidic agents can also be employed, e.g. zinc chloride in the presence of hydrochloric acid. By the cyclization reaction, a chromane ring is formed, wherein the oxygen-containing 6-membered ring is formed from the 1- and 6-carbon atoms of the hydroquinone, the oxygen atom attached to the 1-carbon atom and also the first three carbon atoms of the side chain introduced by the reagent of Formula I above. The products obtained are yellow compounds which can suitably be purified by chromatography or distillation.

These cyclized products can also be obtained directly, by applying the reaction conditions described in the preceding paragraph to 2,3-dimethoxy-5-methyl-1,4-benzohydroquinone or, respectively, a 4-monoacyl derivative thereof, and a compound of Formula I or, respectively, an allyl-rearrangement product thereof. Here also, it should be observed that in case of compounds of Formula I wherein the bond shown by the dotted line is not hydrogenated, such conditions must be chosen that the unsaturated radical remains unattacked. Appropriately one employs an ω-halogen compound of Formula I (the tertiary halides of Formula I which have not been subjected to allyl rearrangement are unstable) and the reaction is effected in an inert solvent, e.g. petroleum ether, in the presence of boron trifluoride etherate, by heating the reaction mixture at the boiling temperature of the solvent. In the case where the compound of Formula I is hydrogenated at the bond shown by the dotted line, zinc chloride with hydrochloric acid can also be employed as the condensing cyclizing agent. In an advantageous mode of execution, the starting material is an essentially saturated alcohol, e.g. one which contains only one α,β-double bond, and the reaction is effected in an inert solvent, e.g. petroleum ether, by the use of zinc chloride and hydrochloric acid at the reflux temperature of the reaction mixture.

From the foregoing, it will be appreciated that in one of its product embodiments, the invention provides novel compounds represented by the general formula (II)

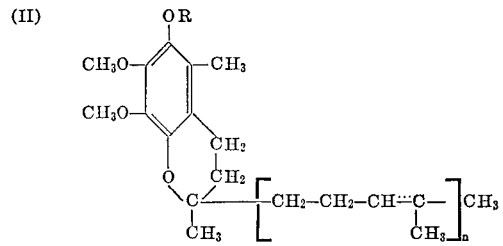

wherein R represents a member selected from the group consisting of hydrogen, lower alkanoyl and benzoyl, $n$ represents a number from 0 to 9, inclusive, and the double bond shown by the dotted line can optionally be fully hydrogenated.

Moreover, in another of its product embodiments, the invention provides novel compounds represented by the general formula (III)

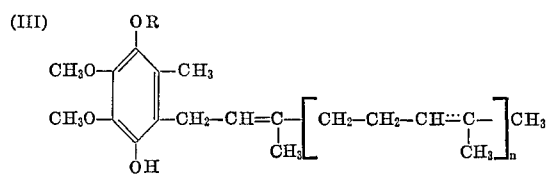

wherein R represents a member selected from the group consisting of hydrogen, lower alkanoyl and benzoyl, $n$ represents a number from 0 to 9, inclusive, and the double bond shown by the dotted line can optionally be fully hydrogenated.

In still another of its product embodiments, the invention provides novel compounds represented by the general formula (IV)

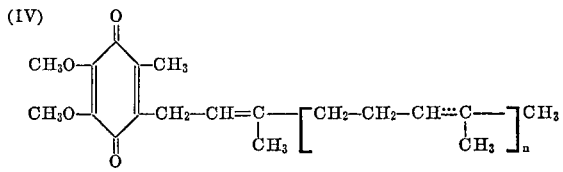

wherein $n$ represents an integer from 1 to 5, inclusive, and the double bond shown by the dotted line can optionally be fully hydrogenated.

The novel compounds of Formulas II, III, and IV provided by the invention are fundamental components of biological oxidation systems. Moreover, the benzoquinone and benzohydroquinone portions thereof are essential, in the sense that they cannot be synthesized by higher organisms, but must be supplied from outside these organisms as vitamins. A deficiency caused either by insufficient supply or by any disturbance of their synthesis by the enteric flora may be compensated for by addition of the products of the invention to foodstuffs and feedstuffs. There is an especially high requirement of said compounds under stress conditions, e.g. in the case of treatments employing antibacterial or antiparasitic preparations. The substituted benzohydroquinones and substituted chromanols prepared according to the invention, moreover, are useful as antioxidants for foodstuffs, feedstuffs, vitamin preparations and the like.

The invention is further disclosed in the following examples, which are illustrative but not limitative thereof. Temperatures are stated in degrees centigrade.

EXAMPLE 1

5 g. of 2,3-dimethoxy-5-methyl-1,4-benzohydroquinone are shaken overnight in a nitrogen atmosphere with 2.7 g. of anhydrous zinc chloride, 12 g. of phytol, 150 ml. of absolute ether and 0.3 ml. of glacial acetic acid and then the mixture is refluxed for 1½ hours. The solvent is evaporated at room temperature under a water pump vacuum, the residue is dissolved in a mixture of 500 ml. of petroleum ether (boiling range 40–45°) and 250 ml. of 75% methanol and the petroleum ether solution is washed three times with 250 ml. portions of 75% methanol. The methanol solutions are extracted one after the other in a second separatory funnel with 250 ml. of petroleum ether. By dilution of the methanol solutions with water and extraction with ether some starting material can be recovered. The petroleum ether solutions are combined, washed with water, dried with sodium sulfate and the solvent is evaporated. The crude product is dissolved in petroleum ether and chromatographed on a column of 300 g. of aluminum oxide (Brockmann activity I, deactivated with 4% of water). By elution with 3 liters of petroleum ether there is obtained 3 g. of a yellow oil and then by elution with one liter of ether there is obtained 9.5 g. of red 2,3-dimethoxy-5-methyl-6-phytyl-1,4-benzohydroquinone; U.V. maximum at 278 mμ;

$E_{1cm.}^{1\%}=$ ca. 60

(in petroleum ether).

EXAMPLE 2

5 g. of 2,3-dimethoxy-5-methyl-1,4-benzohydroquinone are condensed with 12 g. of geranyllinalool in the manner described in Example 1. After working up according to the indications in Example 1 there is obtained 2,3-dimethoxy-5-methyl-6-geranylgeranyl - 1,4 - benzohydroquinone as a yellow-orange viscous oil; U.V. maximum at 277 mμ.

EXAMPLE 3

6. g. of 2,3-dimethoxy-5-methyl-1,4-benzoquinone in 50 ml. of methanol are shaken in a hydrogen atmosphere with 0.5 g. of "Lindlar catalyst," viz. 5% palladium-lead-calcium carbonate catalyst (Lindlar, Helvetica Chimica Acta 35, 450 [1952]), until the hydrogen uptake ceases (requires about 30 minutes). Then the catalyst is filtered off, the methanol is evaporated under a water pump vacuum and the crude product is dried for one hour in a high vacuum, whereupon it crystallizes. To acomplish the condensation reaction, the hydroquinone so obtained is shaken overnight at room temperature in a nitrogen atmosphere in 180 ml. of absolute ether with 0.3 ml. of glacial acetic acid, 3.3 g. of anhydrous zinc chloride and 20 g. of all-trans-farnesylnerolidol, then the reaction mixture is refluxed for 1½ hours. The solvent is removed under a water pump vacuum and the residue is dissolved in 500 ml. of petroleum ether (boiling range 30–45°) and 250 ml. of 70% methanol. The petroleum ether solution is extracted three times with 250 ml. portions of 70% methanol and the methanol solutions are extracted one after the other in a second separatory funnel with 250 ml. of petroleum ether. The combined petroleum ether solutions are evaporated, washed and dried, yielding 17.5 g. of a yellow-brown oil. The latter is dissolved in 50 ml. of petroleum ether (boiling range 80–110°), 1 g. of "Lindler catalyst" as described above is added, and then the material is hydrogenated. The catalyst is filtered off, and the filtrate is chromatographed on a column of 400 g. of aluminum oxide (Brockmann activity I, deactivated with 4% water). By elution with 3.5 liters of petroleum ether (boiling range 30–45°) there are obtained 8 g. of byproducts, then by elution with one liter of ether there is obtained 8.3 g. of the condensation product 2,3-dimethoxy-5-methyl-6-all - trans - farnesylfarnesyl-1,4-benzohydroquinone, obtained as an orange-yellow oil; U.V. maximum at 278 m$\mu$ (in petroleum ether).

EXAMPLE 4

9.5 g. of 2,3-dimethoxy-5-methyl-6-phytyl-1,4-benzohydroquinone is dissolved in 200 ml. of ether and shaken for two hours at room temperature with 20 g. of silver oxide. Then the solution is filtered and the solvent is evaporated. The crude product is chromatographed on a column of 250 g. of aluminum oxide (Brockmann activity I, deactivated with 7% of water) and then 2,3-dimethoxy-5-methyl-6-phytyl-1,4 - benzoquinone is eluted with petroleum ether. There is thus obtained 2,3-dimethoxy-5-methyl-6-phytyl-1,4-benzoquinone as a yellow product having U.V. maximum at 272 m$\mu$, $E_{1\,cm}^{1\%}$ 308

(in petroleum ether).

EXAMPLE 5

The 2,3 - dimethoxy - 5 - methyl-6-geranylgeranyl-1,4-benzohydroquinone product obtained in Example 2 is oxidized according to the indications in Example 4. There is thus obtained 2,3-dimethoxy-5-methyl-6-geranylgeranyl-1,4-benzoquinone as a yellow viscous oil having a U.V. maximum at 273 m$\mu$, $E_{1\,cm}^{1\%} = 306$ (in petroleum ether).

EXAMPLE 6

The 2,3 - dimethoxy - 5 - methyl-6-all-trans-farnesylfarnesyl-1,4-benzohydroquinone product obtained according to Example 3 is shaken at room temperature for two hours in 100 ml. of ether with 20 g. of silver oxide. Then the mixture is filtered and the ether is evaporated, yielding crude 2,3 - dimethoxy-5-methyl-6-all - trans-farnesylfarnesyl-1,4-benzoquinone as a yellow-orange oil having a U.V. maximum at 272 m$\mu$. For further purification, the product is chromatographed on 150 g. of aluminum oxide (Brockmann activity I, deactivated with 7% of water) and then 5.5 g. of substance are eluted by petroleum ether (boiling range 30–45°).

116 mg. of this concentrate ($\lambda$ max. in cyclohexane 272 m$\mu$, $E_{1\,cm}^{1\%} = $ca. 100)

is chromatographed on 10 g. of polyethylene powder ("Hostalen W") using 72% aqueous acetone as the mobile phase. One hundred fractions, each of 5.5 ml., are collected. The yellowish fractions numbers 51–70 (275–380 ml.) are combined, diluted with water and extracted with petroleum ether; the extract is washed with water and freed of solvent, yielding 30 mg. of a residual deep orange oil. U.V. absorption spectrum in cyclohexane: minimum at 237 m$\mu$ ($E_{1\,cm}^{1\%}$ 69)

and maximum at 272 m$\mu$ ($E_{1\,cm}^{1\%}$ 260)

The oil is crystallized at minus 15° from a ten-fold quantity of absolute alcohol or acetone. The crystals melt at 19–20°.

EXAMPLE 7

5 g. of 2,3-dimethoxy-5-methyl-1,4-benzohydroquinone is refluxed in 50 ml. of petroleum ether (boiling range 80–110°) with 0.5 ml. of boron trifluoride etherate, while stirring. A solution of 9 g. of phytyl bromide in 10 ml. of petroleum ether (boiling range 80–110°) is dropped in over a period of 30 minutes. The reaction mixture is heated at the boiling point, while stirring, for a further period of eight hours. Then it is cooled, diluted with 100 ml. of petroleum ether (boiling range 40–50°), washed with water, then with 80% methanol, again with water, dried over sodium sulfate and the solvent is evaporated. There is obtained 10 g. of a reddish-brown oil;

$n_D^{24} = 1.4860$;

U.V. maximum at 292 m$\mu$. The crude 2-(4,8,12-trimethyltridecan - 1 - yl) - 2,5 - dimethyl-7,8-dimethoxy-6-chromanol can be purified by adsorption on aluminum oxide (activity IV, Brockmann).

EXAMPLE 8

5 g. of 2,3-dimethoxy-5-methyl-1,4-benzohydroquinone is condensed with 5.5 g. of geranyl bromide, according to the indications in Example 7. There is obtained 7.8 g. of a reddish-brown oil; $n_D^{23} = 1.5321$; U.V. maximum at 292 m$\mu$. The crude 2-(4-methyl - 3 - penten-1-yl)-2,5-dimethyl-7,8-dimethoxy-6-chromanol can be purified by adsorption on aluminum oxide (activity IV, Brockmann).

EXAMPLE 9

3 g. of 2,3-dimethoxy-5-methyl-1,4-benzohydroquinone in a mixture of 20 ml. of absolute benzene and 10 ml. of absolute ether is refluxed, while stirring, with 1 g. of zinc chloride, while passing through hydrogen chloride gas. A solution of 5 g. of isophytol in 10 ml. of benzene is added dropwise over a period of 30 minutes, and the mixture is refluxed for an additional period of three hours. Then the mixture is allowed to cool, diluted with 100 ml. of petroleum ether (boiling range 40–50°) and washed in turn with water, 80% methanol, and then again with water. It is dried with sodium sulfate and the solvent is evaporated. There is obtained 8.1 g. of a brown oil of 2-(4,8,12-trimethyltridecan - 1 - yl)-2,5-dimethyl-7,8-dimethoxy - 6 - chromanol, $n_D^{22} = 1.4922$; U.V. maximum at 292 m$\mu$. The crude product can be purified by adsorption on aluminum oxide (activity IV, Brockmann).

EXAMPLE 10

0.2 g. of 2,3-dimethoxy-5-methyl-6-geranylgeranyl-1,4-benzoquinone are reduced in 20 ml. of methanol with 0.2 g. of "Lindlar catalyst" (above described) to the corresponding hydroquinone. The catalyst is filtered off and the solvent is removed by evaporation while excluding air.

The hydroquinone obtained is suspended in 10 ml. of petroleum ether (boiling range 80–110°), mixed with 0.02 ml. of boron trifluoride etherate and the mixture is refluxed for three hours. The mixture is cooled and diluted with 50 ml. of petroleum ether (boiling range 40–50°), washed to neutrality with water, dried over sodium sulfate and then the solvent is evaporated in vacuo. There is obtained 0.2 g. of crude 2-(4,8,12,16,20-pentamethyl-3,7,11,15,19 - heneicosapentaen-1-yl)-2,5-dimethyl - 7,8-dimethoxy-6-chromanol; $n_D^{22}=1.5111$; U.V. maximum at 288 mμ. The product can be purified by adsorption on aluminum oxide (activity IV, Brockmann).

What is claimed is:
1. Compounds represented by the general formula

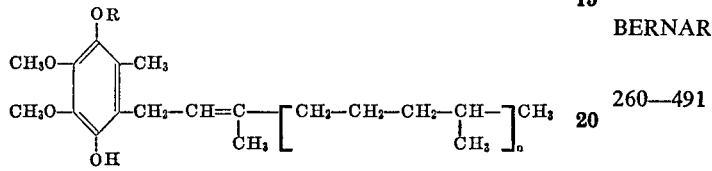

wherein R is hydrogen and $n$ represents a number from 0 to 9, inclusive.

2. 2,3 - dimethoxy-5-methyl-6-phytyl-1,4-benzohydroquinone.

References Cited
UNITED STATES PATENTS 2,376,984  5/1945  Tishler _____ 260—396
3,068,295  12/1962  Folkers et al.

OTHER REFERENCES

Shuuk et al., Jour. Amer. Chem. Soc., volume 80, Sept. 5, 1958, page 4753.

Wagner et al., Synthetic Organic Chemistry (1953), pages 169–170.

BERNARD HELFIN, Primary Examiner

U.S. Cl. X.R.

260—491